(12) United States Patent
Baskakov et al.

(10) Patent No.: US 11,586,371 B2
(45) Date of Patent: Feb. 21, 2023

(54) PREPOPULATING PAGE TABLES FOR MEMORY OF WORKLOADS DURING LIVE MIGRATIONS

(71) Applicant: VMware, Inc., Palo Alto, CA (US)

(72) Inventors: Yury Baskakov, Newton, MA (US); Ying Yu, Bellevue, WA (US); Anurekh Saxena, Newcastle, WA (US); Arunachalam Ramanathan, Union City, CA (US); Frederick Joseph Jacobs, Los Gatos, CA (US); Giritharan Rashiyamany, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/384,382

(22) Filed: Jul. 23, 2021

(65) Prior Publication Data

US 2023/0023452 A1 Jan. 26, 2023

(51) Int. Cl.
*G06F 12/1009* (2016.01)
*G06F 3/06* (2006.01)
*G06F 9/455* (2018.01)
*G06F 12/109* (2016.01)

(52) U.S. Cl.
CPC .......... *G06F 3/0647* (2013.01); *G06F 3/0662* (2013.01); *G06F 3/0676* (2013.01); *G06F 3/0679* (2013.01); *G06F 9/45558* (2013.01); *G06F 12/1009* (2013.01); *G06F 12/109* (2013.01); *G06F 2009/4557* (2013.01); *G06F 2009/45575* (2013.01); *G06F 2212/151* (2013.01); *G06F 2212/657* (2013.01)

(58) Field of Classification Search
CPC .... G06F 3/0647; G06F 3/0662; G06F 3/0676; G06F 3/0679; G06F 9/45558; G06F 2009/4557; G06F 2009/45575; G06F 12/1009; G06F 12/109; G06F 2212/151; G06F 2212/657
USPC .......................................................... 711/54
See application file for complete search history.

(56) References Cited

U.S. PATENT DOCUMENTS

| | | | |
|---|---|---|---|
| 10,884,790 B1 * | 1/2021 | Saidi | G06F 12/1027 |
| 11,182,092 B1 * | 11/2021 | Tsirkin | G06F 3/0647 |
| 2005/0015766 A1 * | 1/2005 | Nash | G06F 9/4881 |
| | | | 718/102 |

(Continued)

OTHER PUBLICATIONS

W. Huang, Q. Gao, J. Liu and D. K. Panda, "High performance virtual machine migration with RDMA over modern interconnects," 2007 IEEE International Conference on Cluster Computing, 2007, pp. 11-20, doi: 10.1109/CLUSTR.2007.4629212. (Year: 2007).*

(Continued)

*Primary Examiner* — Reginald G Bragdon
*Assistant Examiner* — Aaron D Ho
(74) *Attorney, Agent, or Firm* — Kim & Stewart LLP

(57) ABSTRACT

A method of populating page tables of an executing workload during migration of the executing workload from a source host to a destination host includes the steps of: before resuming the workload at the destination host, populating the page tables of the workload at the destination host, wherein the populating comprises inserting mappings from virtual addresses of the workload to physical addresses of system memory of the destination host; and upon completion of populating the page tables, resuming the workload at the destination host.

20 Claims, 7 Drawing Sheets

(56) References Cited

U.S. PATENT DOCUMENTS

| | | | | |
|---|---|---|---|---|
| 2012/0059973 | A1* | 3/2012 | Adams | G06F 12/109 |
| | | | | 711/6 |
| 2019/0079695 | A1* | 3/2019 | Ekbote | H04L 67/568 |
| 2019/0286475 | A1* | 9/2019 | Mani | G06F 9/45558 |
| 2020/0034175 | A1* | 1/2020 | Calciu | G06F 9/45558 |
| 2020/0042343 | A1* | 2/2020 | Wang | G06F 9/45558 |
| 2020/0159558 | A1* | 5/2020 | Bak | G06F 9/45558 |
| 2020/0257635 | A1* | 8/2020 | Park | G06F 12/1036 |
| 2021/0089347 | A1* | 3/2021 | Gaonkar | G06F 8/656 |
| 2021/0318900 | A1* | 10/2021 | Gopalan | G06F 9/45558 |
| 2021/0365371 | A1* | 11/2021 | Dong | G06F 12/0802 |
| 2022/0188007 | A1* | 6/2022 | Roberts | G06F 3/0604 |
| 2022/0229774 | A1* | 7/2022 | Waldspurger | G06F 12/0882 |

OTHER PUBLICATIONS

Michael R. Hines, Umesh Deshpande, and Kartik Gopalan. 2009. Post-copy live migration of virtual machines. SIGOPS Oper. Syst. Rev. 43, 3 (Jul. 2009), 14-26. https://doi.org/10.1145/1618525.1618528 (Year: 2009).*

Violeta Medina and Juan Manuel García. 2014. A survey of migration mechanisms of virtual machines. ACM Comput. Surv. 46, 3, Article 30 (Jan. 2014), 33 pages, https://doi.org/10.1145/2492705 (Year: 2014).*

S. Sahni and V. Varma, "A Hybrid Approach to Live Migration of Virtual Machines," 2012 IEEE International Conference on Cloud Computing in Emerging Markets (CCEM), 2012, pp. 1-5, doi: 10.1109/CCEM.2012.6354587. (Year: 2012).*

* cited by examiner

PREPOPULATING PAGE TABLES FOR MEMORY OF WORKLOADS DURING LIVE MIGRATIONS

BACKGROUND

In a virtualized computing system, a computing platform of a physical host may be encapsulated into virtual machines (VMs) running applications. A VM abstracts the processing, memory, storage, and the like of the computing platform for a guest operating system (OS) of the VM. Virtualization software on a host, also referred to as a "hypervisor," provides an execution environment for VMs, and a virtualization manager migrates VMs between hosts. Such migrations may be performed "live," i.e., while VMs are running. For such live migrations, one goal is to migrate VMs with minimal impact on performance.

Prior to a "switch-over" in which a VM is "quiesced" on a source host and resumed on a destination host, various operations are performed on the VM. Such operations include copying the state of the VM's memory from the source host to the destination host. However, until the VM is switched over to the destination host, the VM continues executing applications at the source host. During this execution, some of the memory of the source host that is copied to the destination host is later modified by the VM at the source host. As such, an iterative "pre-copying" phase may be used in which at a first iteration, all the VM's memory is copied from the source host to the destination host. Then, during each subsequent iteration, memory of the source host that has been modified is copied again to the destination host.

During the pre-copying phase, the VM's memory may be copied to the destination host in relatively small units, e.g., in 4-KB "pages." The use of small units reduces the amplification of "dirty" data by isolating the modifications made between iterations to smaller units of memory. For example, if a few modifications are made in a certain memory region, it is preferable to only retransmit a few 4-KB pages that contain the modifications than to retransmit an entire, e.g., 2-MB page that contains the modifications.

Although the VM's memory may be copied to the destination host in relatively small units, the hypervisors of the source and destination hosts may employ virtual memory spaces that divide memory into larger units. For example, the VM may employ a virtual address space that divides memory into "small" 4-KB pages. However, the hypervisors may employ separate virtual address spaces that divide memory into "large" 2-MB pages, each large page containing 512 contiguous 4-KB pages.

Use of large pages is generally advantageous for virtual memory system performance. For an application of a VM to touch system memory of the destination host, the application may issue an input/output operation (IO) to a virtual address of the VM, also referred to as a "guest virtual address." The guest virtual address may be translated into a physical memory address of system memory by "walking," i.e., traversing two sets of page tables that contain mapping information: a first set maintained by the VM and a second set maintained by the hypervisor. The page tables maintained by the hypervisor are referred to as "nested" page tables. To speed up translation, a translation lookaside buffer (TLB) may be utilized that contains beginning-to-end mappings of guest virtual addresses to physical memory addresses. However, such a TLB is limited in size and thus only contains some mappings, e.g., those of recently-accessed guest virtual addresses. When an application requests to access memory at a guest virtual address for which the TLB contains no mapping, a "TLB miss" occurs, and the page tables must be walked. Use of relatively large pages minimizes the number of TLB misses and thus minimizes the number of expensive page-table walks.

When a VM is migrated to a destination host, the nested page tables of the destination host do not contain mappings from the VM's address space to physical memory addresses of the destination host. As such, in existing systems, once the VM resumes on the destination host and begins accessing memory at various virtual addresses, new mappings must be created on demand. Creating such mappings on demand often significantly degrades VM performance for extended periods of time, especially for memory-intensive VMs that touch memory rapidly. A method is needed that improves the responsiveness of VMs after migrations.

SUMMARY

Accordingly, one or more embodiments provide a method of populating page tables of an executing workload during migration of the executing workload from a source host to a destination host. The method includes the steps of: before resuming the workload at the destination host, populating the page tables of the workload at the destination host, wherein the populating comprises inserting mappings from virtual addresses of the workload to physical addresses of system memory of the destination host; and upon completion of populating the page tables, resuming the workload at the destination host.

Further embodiments include a non-transitory computer-readable storage medium comprising instructions that cause a host to carry out the above method, as well as a computer system configured to carry out the above method.

DETAILED DESCRIPTION

Techniques for improving the responsiveness of VMs after migration are described. The techniques involve pre-populating nested page tables of a destination host with mappings from the host virtual address space allocated for the VM to host physical memory addresses before resuming the VM. Such prepopulating of page tables reduces the need for page fault handling upon the resumption of the VM. Furthermore, optimizations such as prepopulating the page tables in batches of mappings may be utilized to decrease the amount of time needed to perform the prepopulating.

A list of pages for which prepopulating will be carried out may be prepared based on various techniques. Mappings may be prepopulated for all pages copied to a destination host during migration, or a smaller list may be prepared that balances the duration of the prepopulating with the responsiveness of the VM after the migration. For example, mappings may be prepopulated for large pages that include small pages that have been accessed during the migration. Additionally, the list of pages may be curtailed based on heuristics such as frequency and recency of page accesses. Such techniques reduce the length of time for the prepopulating by only focusing on pages that are most likely to be accessed shortly after a VM resumes. Furthermore, the prepopulating may be terminated after a predetermined amount of time.

In the first embodiment described below, the list of pages is prepared at the destination host. In the second embodiment described below, the list of pages is prepared at the source host and transmitted to the destination host. In some embodiments, the list of pages is prepared by a combination of the source and destination hosts. Furthermore, although the disclosure is described with reference to VMs, the teachings herein also apply to nonvirtualized applications and to other types of virtual computing instances such as containers, Docker® containers, data compute nodes, isolated user space instances, and the like for which a virtual memory environment may benefit from prepopulating page tables before resuming a workload at a destination host. These and further aspects of the invention are discussed below with respect to the drawings.

Figure 1:
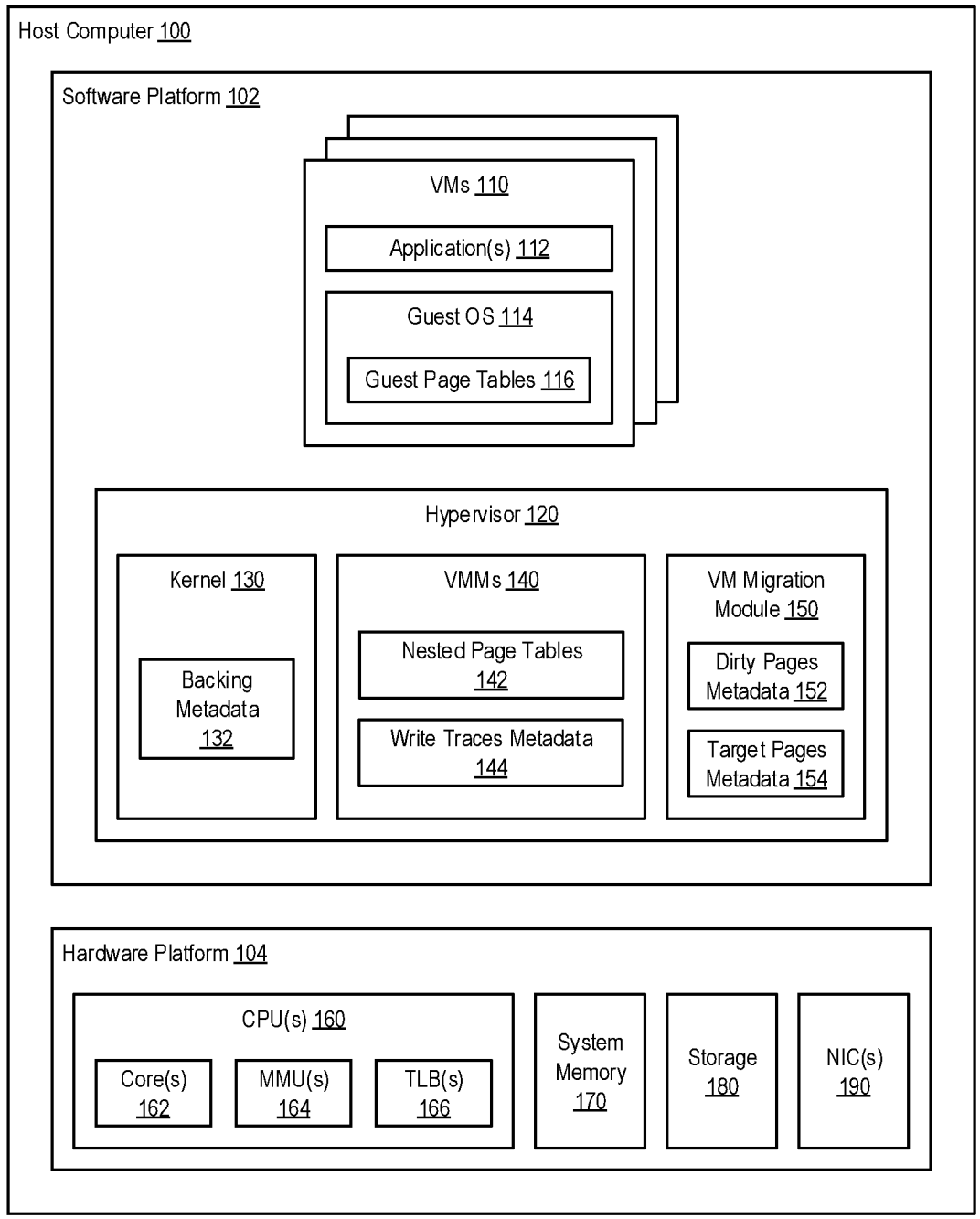
FIG. 1 is a block diagram of a host computer that may be used for a live migration of a VM, according to embodiments.

FIG. 1 is a block diagram of a host computer (also referred to as "host" for short) 100 that may be used for a live migration of a VM 110, according to embodiments. Host 100 may be a physical computer server constructed on a server grade hardware platform 104 such as an x86 architecture platform.

Hardware platform 104 includes conventional components of a computing device, such as one or more central processing units (CPUs) 160, system memory 170 such as random-access memory (RAM), optional local storage 180 such as one or more hard disk drives (HDDs) or solid-state drives (SSDs), and one or more network interface cards (NICs) 190. CPU(s) 160 are configured to execute instructions such as executable instructions that perform one or more operations described herein, which may be stored in system memory 170. Local storage 180 may also optionally be aggregated and provisioned as a virtual storage area network (vSAN). NIC(s) 190 enable host 100 to communicate with other devices over a physical network (not shown).

Each CPU 160 includes one or more cores 162, memory management units (MMUs) 164, and TLBs 166. Each core 162 is a microprocessor such as an x86 microprocessor. Each MMU 164 is a hardware unit that supports "paging" of system memory 170. Paging provides a virtual memory environment in which a virtual address space is divided into pages, each page being an individually addressable unit of memory. Each page further includes a plurality of separately addressable data words, each of which includes one or more bytes of data. Pages are identified by addresses referred to as "page numbers." CPU(s) 160 can support multiple page sizes including 4-KB, 2-MB, and 1-GB page sizes.

Page tables provide a mapping from the virtual address space to physical address space. Page tables are arranged in a hierarchy that may include various levels. Each page table includes entries, each of which specifies control information and a reference to either another page table or to a memory page. The hierarchy and individual structures of page tables will be described further below in conjunction with FIG. 2A. In the example shown in FIG. 1, guest page tables 116 are used to translate guest virtual addresses to guest physical addresses or guest physical page numbers (referred to herein as PPNs), i.e., addresses that appear to be physical memory addresses from the perspective of a VM 110 but that are actually virtual addresses from the perspective of host computer 100. Nested page tables 142 are used to translate PPNs to physical memory addresses or machine page numbers (referred to herein as MPNs) of system memory 170. A guest OS 114 and hypervisor 120 expose their respective page tables to CPU(s) 160.

MMU(s) 164 traverse or "walk" the page tables to translate virtual page numbers to physical page numbers, from guest virtual addresses to PPNs using guest page tables 116 and from PPNs to MPNs using nested page tables 142. TLB(s) 166 are caches that store full address translations for MMU(s) 164 from guest virtual addresses to MPNs. A CPU 160 may contain an MMU 164 and a TLB 166 for each core 162. If valid and present, an MMU 164 obtains a translation from a guest virtual address to an MPN directly from a TLB 166. Otherwise, an MMU 164 traverses the page tables to obtain the translation.

Software platform 102 includes a hypervisor 120, which is a virtualization software layer that abstracts hardware resources of hardware platform 104 for concurrently running VMs 110. One example of a hypervisor 120 that may be used is a VMware ESXi™ hypervisor by VMware, Inc. Each VM 110 includes one or more applications 112 running on a guest OS 114 such as a Linux® distribution. Guest OS 114 maintains guest page tables 116 for each of the applications running thereon.

Hypervisor 120 includes a kernel 130, VM monitors (VMMs) 140, and a VM migration module 150. Kernel 130 provides OS functionalities such as file system, process creation and control, and process threads. Kernel 130 also provides CPU and memory scheduling across VMs 110, VMMs 140, and VM migration module 150. During migration of VM 110 to a destination host computer, kernel 130 of the destination host computer maintains backing metadata 132. Backing metadata 132 includes MPNs of system memory 170 at which migrated memory pages are stored, and associates these MPNs to PPNs of the migrated memory pages. Backing metadata 132 also includes flags indicating types and properties of such migrated memory pages.

VMMs 140 implement the virtual system support needed to coordinate operations between VMs 110 and hypervisor 120. Each VMM 140 manages a virtual hardware platform for a corresponding VM 110. Such a virtual hardware platform includes emulated hardware such as virtual CPUs (vCPUs) and guest physical memory. Each VMM 140 also maintains nested page tables 142 for a corresponding VM 110, as discussed further below.

VM migration module 150 manages migrations of VMs 110 between host computer 100 and other host computers. VMMs 140 and VM migration module 150 include write traces metadata 144 and "dirty" pages metadata 152, respectively, which are used for detecting modified memory pages during migration of VM 110 from host computer 100. Metadata 144 and 152 are described further below in conjunction with FIG. 4. VM migration module 150 also maintains "target" pages metadata 154, which indicates pages to prepopulate mappings for, referred to herein as target pages, before resuming a VM 110 on a host computer. For example, target pages metadata 154 may be a list of PPNs of target pages or a bitmap in which each bit corresponds to a PPN.

Figure 2A:
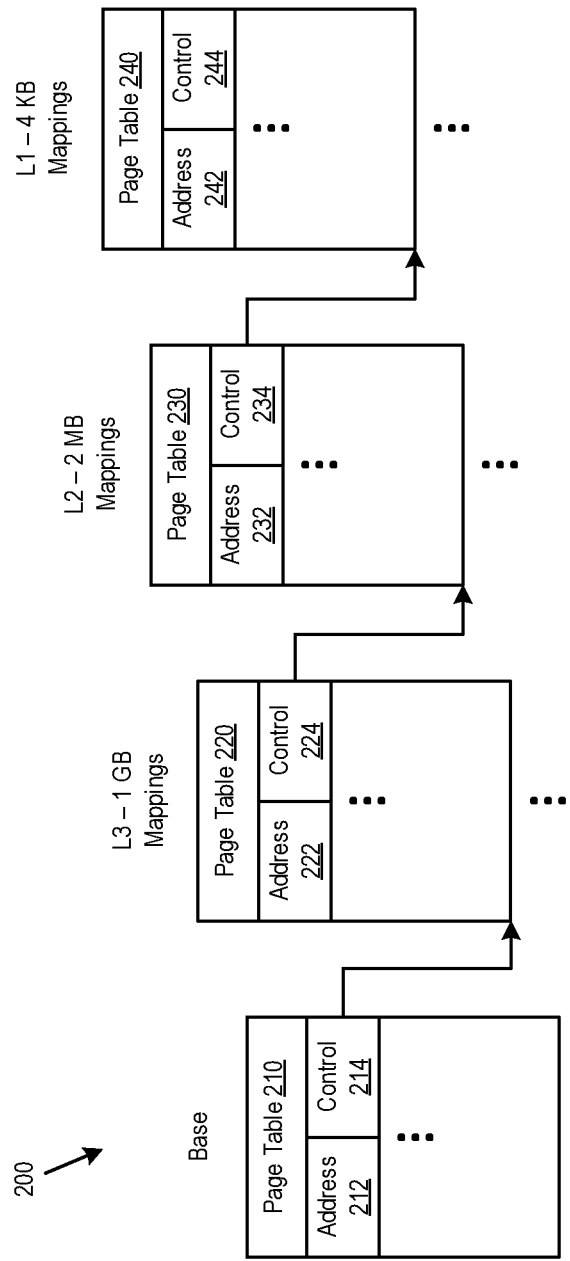
FIG. 2A is a block diagram of memory page tables in a page table hierarchy, according to embodiments.

FIG. 2A is a block diagram of memory page tables in a page table hierarchy 200, according to embodiments. In the embodiment of FIG. 2A, page table hierarchy 200 is a four-level hierarchy such as can be configured for use by CPU(s) 160 of FIG. 1. However, page table hierarchies may include more or less than four levels. Furthermore, page table hierarchy 200 could correspond to either of guest page tables 116 or nested page tables 142.

Page table hierarchy 200 includes a base page table 210, level 3 (L3) page tables 220, level 2 (L2) page tables 230, and level 1 (L1) page tables 240. L3 includes a number of page tables 220 corresponding to the number of page table entries (PTEs) in base page table 210, e.g., 512 L3 page tables 220. L2 includes a number of page tables 230 corresponding to the product of the number of PTEs per L3 page table 220 and the total number of L3 page tables 220, e.g., 512×512=$512^2$ L2 page tables 230. L1 includes a number of page tables 240 corresponding to the product of the number of PTEs per L2 page table 230 and the total number of L2 page tables 230, e.g., 512×$512^2$=5123 L1 page tables 240.

In the example of FIG. 2A, each PTE of L1 page tables 240 controls a 4-KB memory region, i.e., contains an address 242 that is either a PPN corresponding to a 4-KB VM memory page in the case of guest page tables 116 or an MPN corresponding to a 4-KB VM memory page in the case of nested page tables 142. Each PTE of the L2 page tables 230 controls a 2-MB memory region, i.e., contains an address 232 of an L1 page table 240 containing 512 4-KB PTEs. Each PTE of the L3 page tables 220 controls a 1-GB memory region, i.e., contains an address 222 of an L2 page table 230 containing 512 2-MB PTEs. As such, in the example of FIG. 2A, a virtual address space is divided into 4-KB pages. However, for example, in the case of a virtual address space that is divided into 2-MB pages, PTEs in the L2 page tables 230 may contain PPNs or MPNs corresponding to 2-MB VM memory pages. Furthermore, page table hierarchy 200 may also be configured with different page sizes at each level.

Each PTE of page table hierarchy 200 also includes various control bits. Control bits may include flags such as a "present" flag indicating whether a mapping is present, a "dirty" flag indicating whether a translation is performed in response to a write instruction, and a "PS" flag indicating whether a PTE maps to a page table or to a memory page. For example, the control bits 244 of PTEs in L1 page tables 240 may contain PS flags that are set, indicating that such PTEs contain either PPNs or MPNs. On other hand, the control bits 214, 224, and 234 of PTEs in base page table 210, L3 page tables 220, and L2 page tables 230 may contain PS flags that are unset, indicating that such PTEs contain addresses of other page tables.

Figure 2B:
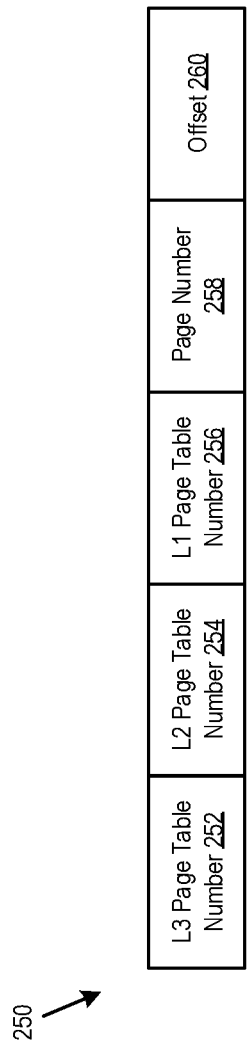
FIG. 2B is a block diagram illustrating an example of an address that may be used to walk memory page tables, according to embodiments.

FIG. 2B is a block diagram illustrating an example of an address 250 that may be used to walk memory page tables, according to embodiments. Address 250 is formatted for the four-level page table hierarchy 200 shown in the example of FIG. 2A.

Within address 250, an L3 page table number 252 selects a PTE in base page table 210 that points to an L3 page table 220. An L2 page table number 254 selects a PTE in an L3 page table 220 that points to one of L2 page tables 230. An L1 page table number 256 selects a PTE in an L2 page table 230 that points to one of L1 page tables 240. A page number 258 selects a PTE in an L1 page table 240 that contains a PPN or MPN corresponding to a 4-KB VM memory page. An offset 260 specifies a position within a selected 4-KB VM memory page. However, for example, in the case of a virtual memory space that is instead divided into 2-MB pages, the L1 page table number 256 may be eliminated, the page number 258 may select a PTE in an L2 page table 230 that contains a PPN or MPN corresponding to a 2-MB VM memory page, and the offset 260 may specify a position within a selected 2-MB VM memory page.

Figure 3:
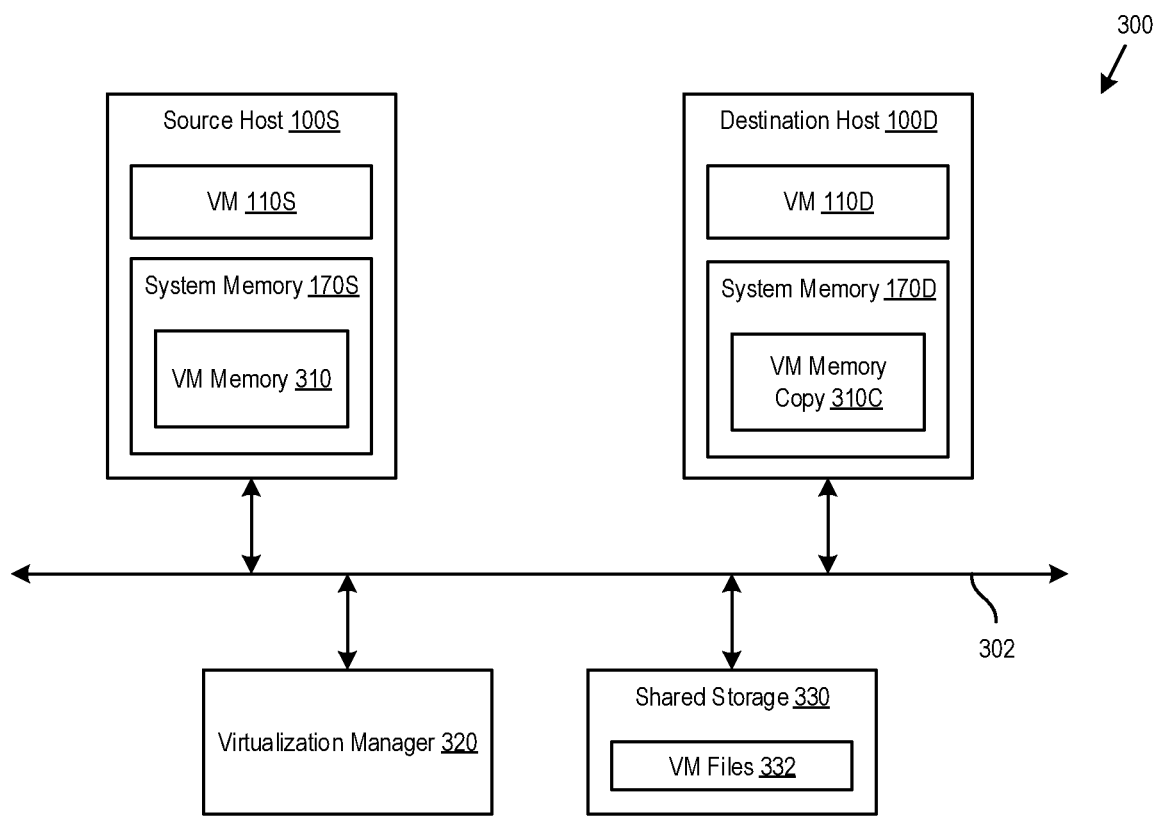
FIG. 3 is a block diagram of a virtualized computing system in which a VM may be migrated from a source host to a destination host, according to embodiments.

FIG. 3 is a block diagram of a virtualized computing system 300 in which a VM may be migrated from a source host 100S to a destination host 100D, according to embodiments. Host computer 100S includes a VM 110S and system memory 170S. VM 110S manages a portion of system memory 170S referred to as VM memory 310. Source host 100S is connected by a network 302 to a destination host 100D to which VM 110S is to be migrated. Network 302 may be, e.g., a physical network that enables communication between hosts 100S and 100D and between other components and hosts 100S and 100D.

Virtualized computing system 300 further includes a virtualization manager 320 and shared storage 330. Virtualization manager 320 performs administrative tasks such as managing hosts 100S and 100D, provisioning and managing VMs therein, migrating VM 110S from source host 100S to destination host 100D, and load balancing between hosts 100S and 100D. Virtualization manager 320 may be a computer program that resides and executes in a server or, in other embodiments, a VM executing in one of hosts 100S and 100D. One example of a virtualization manager 320 is the VMware vCenter Server® by VMware, Inc.

After migration of VM 110S from source host 100S to destination host 100D, VM 110S runs as VM 110D in destination host 100D. The image of VM 110D in system memory 170D is depicted as VM memory copy 310C, which is a copy of VM memory 310. Shared storage 330 accessible by host 100S and host 100D includes VM files 332, which include, e.g., application and guest OS files. Although the example of FIG. 3 includes VM files 332 in shared storage 330, the techniques described herein can also be employed in VM migrations in which each host accesses VM files on separate storage systems. In such an embodiment, VM files 332 are copied from a source storage system to a destination storage system.

Figure 4:
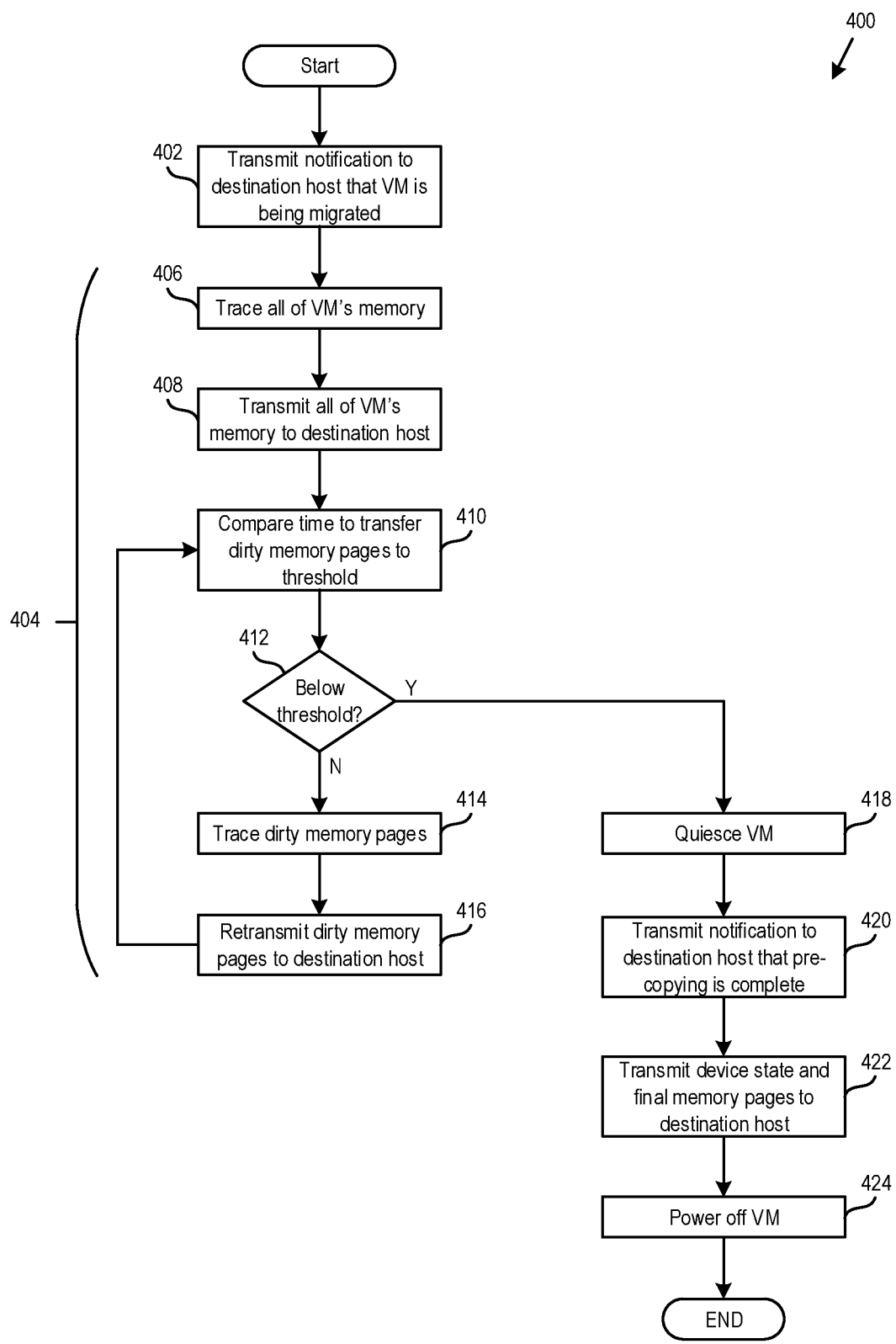
FIG. 4 is a flow diagram of steps carried out by a source host to perform a method of migrating a VM, according to a first embodiment.

FIG. 4 is a flow diagram of steps carried out by a source host to perform a method 400 of migrating a VM, according to the first embodiment, in which selection of pages to prepopulate mappings for is determined at the destination host. Method 400 will be explained with reference to source and destination hosts 100S and 100D of FIG. 3, and the VM migration module 150 of source host 100S will be referred to as "source VM migration module" 150.

At step 402, source VM migration module 150 transmits a notification to destination host 100D that VM 110S is being migrated. At step 404, source VM migration module 150 executes an iterative pre-copying of VM memory 310 from source host 100S to destination host 100D. The pre-copying spans steps 406-416. During the pre-copying phase, VM 110S continues executing at source host 100S and can modify memory pages that have already been copied to destination host 100D. Source VM migration module 150 tracks modified VM memory 310 pages between iterations of pre-copying, such modified memory pages also referred to as "dirty" memory pages.

At step 406, source VM migration module 150 installs "write traces" on all pages of VM memory 310 to track which memory pages are subsequently dirtied. The installation of write tracing is further described in U.S. patent application Ser. No. 17/002,233, filed Aug. 25, 2020, the entire contents of which are incorporated herein by reference. VMM 140 in source host 100S maintains write traces metadata 144 which identify the pages of VM memory 310 that are being traced. When VM 110S writes to a traced memory page, source VM migration module 150 is notified, which is referred to as a "trace fire," and source VM migration module 150 tracks such pages as "dirty" in dirty pages metadata 152. Alternative to write tracing, source VM migration module 150 sets "read-only" flags in PTEs referencing pages of VM memory 310 to track which memory pages are subsequently dirtied. When VM 110S writes to any read-only page, a fault is triggered, and the fault handler notifies source VM migration module 150 that the read-only page has been written to. In response, source VM migration module 150 tracks such pages as "dirty" in dirty pages metadata 152. At step 408, source VM migration module 150 transmits all pages of VM memory 310 to destination host 100D along with PPNs of such pages. VM memory 310 is transmitted in units of 4-KB pages, although larger page sizes can be used.

At step 410, source VM migration module 150 accesses dirty pages metadata 152 to determine how many pages of VM memory 310 have been dirtied since the last installation of write traces, e.g., while VM memory 310 was being transmitted to destination host 100D, and compares the amount of time it would take to retransmit these dirty pages to a defined threshold. The amount of time depends on both the total size of the dirty pages and the transmission bandwidth. At step 412, if the amount of time is not below the threshold, method 400 moves to step 414, and source VM migration module 150 re-installs write traces on the dirty pages of VM memory 310. Source VM migration module 150 does not re-install write traces on the other pages of VM memory 310. At step 416, source VM migration module 150 retransmits the dirty pages of VM memory 310 to destination host 100D along with PPNs of such pages.

After step 416, method 400 returns to step 410, and source VM migration module 150 accesses dirty pages metadata 152 to determine how many pages of VM memory 310 have been dirtied since the last installation of write traces (e.g., at step 414) and compares the amount of time it would take to retransmit these dirty pages to the defined threshold. Steps 414 and 416 are repeated for the dirty pages indicated in dirty pages metadata 152 and the method loops back to step 410 if it is determined at step 412 that the amount of time it would take to retransmit these dirty pages is not below the threshold.

At step 412, if the amount of time it would take to retransmit the dirty pages is below the threshold, source VM migration module 150 "quiesces" VM 110S, at which point VM 110S is no longer running and thus no longer modifying VM memory 310. At step 420, source VM migration module 150 transmits a notification to destination host 100D indicating that pre-copying is complete. At step 422, source VM migration module 150 transmits the device state of VM 110S to destination host 100D including the states of any virtual devices used by VM 110S. Source VM migration module 150 also transmits a final set of dirty pages indicated in dirty pages metadata 152 to destination host 100D. At step 424, VM 110S is powered off, and method 400 ends.

In some embodiments, during pre-copying, source host 100S collects and transmits to destination host 100D various information about pages of VM memory 310. For example, source host 100S collects PPNs of memory pages that have been read during pre-copying, e.g., by scanning "accessed" bits in PTEs of nested page tables 142 of VM 110S, and transmits this information to destination host 100D. Like memory pages that have been written to during pre-copying, memory pages that have been read from are relatively likely to be accessed again shortly after migration and may thus be valuable to prepopulate PTEs for such pages.

In another embodiment, if memory is transmitted to destination host 100D in small pages, e.g., 4-KB pages, source VM migration module 150 first locates PPNs of large pages, e.g., 2-MB pages, containing the dirty small pages, by, e.g., masking off a predetermined number of the last bits of the small page's PPN. Source VM migration module 150 then transmits the determined PPNs of large pages to destination host 100D to prepopulate mappings for large pages. Prepopulating mappings for large pages provides the advantage of capturing small pages in the vicinity of small pages that have been written to, which may include small pages that have been read from.

Figure 5:
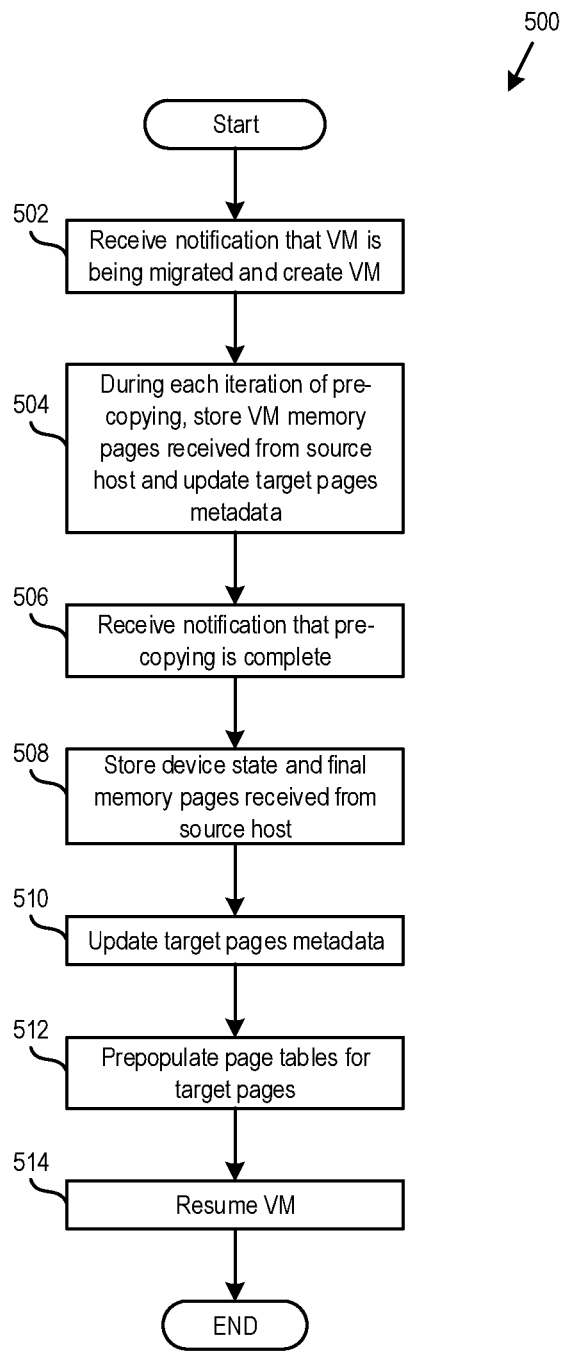
FIG. 5 is a flow diagram of steps carried out by a destination host to perform a method of migrating a VM, according to the first embodiment.

FIG. 5 is a flow diagram of steps carried out by a destination host to perform a method 500 of migrating a VM, according to the first embodiment, in which selection of pages to prepopulate mappings for is determined at the destination host. Method 500 will be explained with reference to source and destination hosts 100S and 100D of FIG. 3, and the VM migration module 150 of destination host 100D will be referred to as "destination VM migration module" 150.

At step 502, destination VM migration module 150 receives notification from source host 100S that VM 110S is being migrated. In response, destination VM migration module 150 creates a VM on destination host 100D, e.g., VM 110D. At step 504, during each iteration of pre-copying, destination VM migration module 150 stores pages of VM memory 310 received from source host 100S in system memory 170D. During the first iteration of pre-copying when all pages of VM memory 310 are received, destination migration module 150 updates backing metadata 132 to associate the MPNs of system memory 170D where the pages of VM memory 310 received from source host 100S are stored with PPNs of such pages. Thereafter, as dirty pages of VM memory 310 are received from source host 100S, destination VM migration module 150 accesses backing metadata 132 to determine the MPNs corresponding to the PPNs of the received dirty pages and stores the dirty pages at the locations in system memory 170D corresponding to these MPNs. At step 504, destination VM migration module 150 also updates target pages metadata 154 to add the PPNs of dirty pages that are received after the first iteration and/or to add the PPNs of large pages that include the dirty pages. Target pages metadata 154 is later used at step 512 to determine the priority of prepopulating the page tables.

At step 506, destination VM migration module 150 receives notification from source host 100S that pre-copying has completed. At step 508, destination VM migration module 150 receives the device state of VM 110S and a final set of dirty pages of VM memory 310 along with their PPNs. Destination VM migration module 150 then stores the device state of VM 110S in system memory 170D, determines the MPNs associated with the PPNs of dirty pages with reference to backing metadata 132, and stores the contents of the dirty pages at the locations in system memory 170D corresponding to these MPNs.

At step 510, destination VM migration module 150 updates target pages metadata 154 to add the PPNs of pages that were dirtied during the last iteration of pre-copying and/or to add the PPNs of large pages that include the dirty pages. In addition, destination VM migration module 150 may modify target pages metadata 154 to include only those pages that meet an access recency criteria or an access frequency criteria. For example, destination VM migration module 150 may decide to only prepopulate mappings for pages that were accessed during the most recent pre-copy iteration. VM migration module 150 may alternatively decide to only prepopulate mappings for pages that were accessed during a certain number of iterations. The VM migration module 150 at source host 100S may even track each access to target pages and maintain running totals of such accesses. Such information may then be transmitted to destination host 100D to accurately determine how frequently pages are accessed at the cost of extra overhead.

At step 512, a VMM 140 at destination host 100D prepopulates nested page tables 142 with mappings for the target pages. The kernel 130 provides the MPNs corresponding to the PPNs of the target pages based on backing metadata 132. In some embodiments, VMM 140 performs the prepopulating of the page tables in batches of mappings to reduce the amount of time needed to perform the prepopulating.

At step 514, upon completion of prepopulating, the VM is resumed as VM 110D. The completion of prepopulating may occur once VMM 140 creates mappings in nested page tables 142 for all of the target pages. Alternatively, destination VM migration module 150 may deem the prepopulating to have been completed after a pre-determined amount of time has elapsed since start of prepopulating, such that VM 110D starts executing before VMM 140 has actually created mappings for all the target pages. After step 514, method 500 ends, and VM 110D continues executing on destination host 100D. As for the pages of VM 110D other than the target pages, the mappings for these pages will not be prepopulated in nested page tables 142. Instead, they will be populated by VMM 140 on demand, i.e., as they are accessed.

Figure 6:
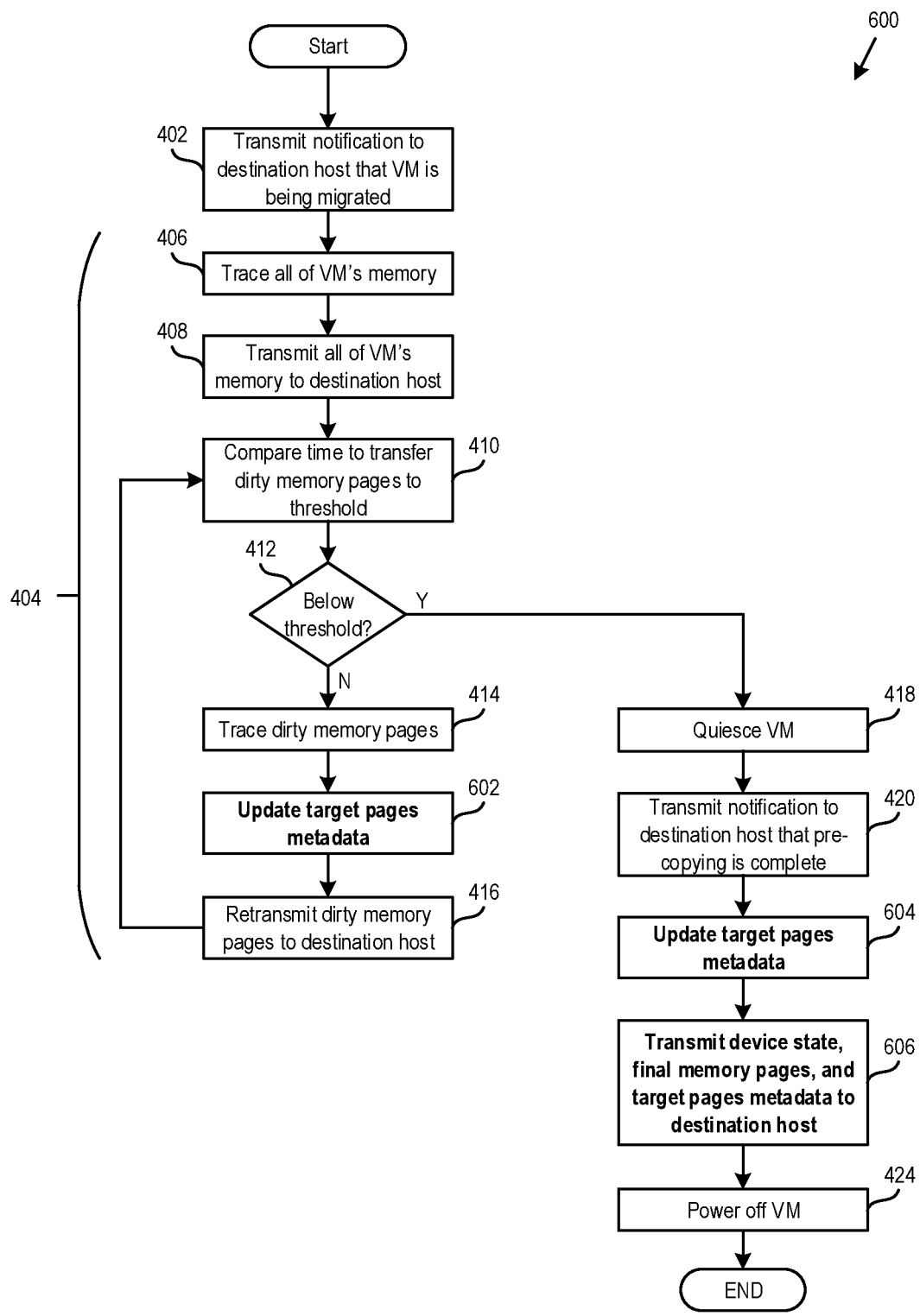
FIG. 6 is a flow diagram of steps carried out by a source host to perform a method of migrating a VM, according to a second embodiment.

FIG. 6 is a flow diagram of steps carried out by a source host to perform a method 600 of migrating a VM, according to the second embodiment, in which selection of pages to prepopulate mappings for is determined at the source host. Method 600 will be explained with reference to source and destination hosts 100S and 100D of FIG. 3, and the VM migration module 150 of source host 100S will be referred to as "source VM migration module" 150. Method 600 is the same as method 400 except steps 602 and 604 have been inserted and step 606 replaces step 422.

Step 602 is inserted after step 414. At step 602, source VM migration module 150 updates target pages metadata 154 at source host 100S. In one embodiment, target pages metadata 154 is updated by adding the PPNs of dirty pages of VM memory 310 to which write traces are re-installed at step 414. Alternatively, source host 100S adds the PPNs of pages of VM memory 310 that are accessed (written to or read from) by scanning the "accessed" bit in PTEs of page tables of VM 110S. In either case, target pages metadata 154 may be updated with the PPNs of small pages that are dirtied or accessed and/or the PPNs of large pages that include these small pages.

Step 604 is inserted after step 420. At step 604, source VM migration module 150 updates target pages metadata 154 to add the PPNs of pages that are dirtied or accessed during the last iteration of pre-copying. During this step, source VM migration module 150 may modify target pages metadata 154 to include only those pages that meet the access-recency criteria or the access-frequency criteria described above.

Step 606 replaces step 422. At step 606, source VM migration module 150 transmits the device state of VM 110S including the states of any virtual devices used by VM 110S and a final set of dirty pages indicated in dirty pages metadata 152 to destination host 100D. In addition, source VM migration module 150 transmits target pages metadata 154 to destination host 100D. After step 606, VM 110S is powered off at step 424, and method 600 ends.

Figure 7:
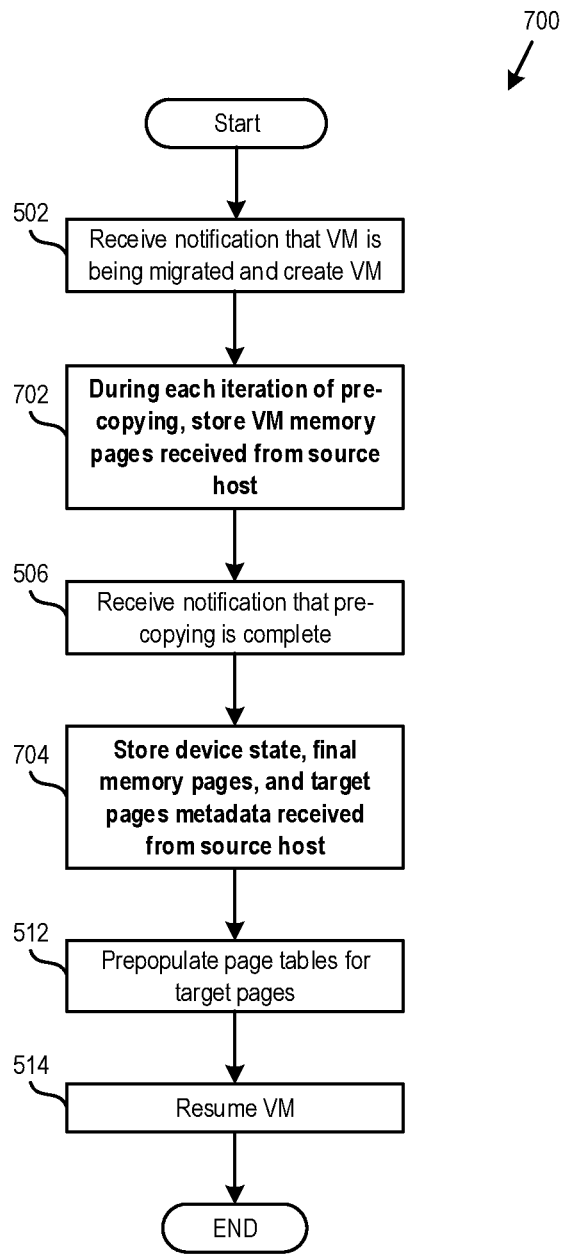
FIG. 7 is a flow diagram of steps carried out by a destination host to perform a method of migrating a VM, according to the second embodiment.

FIG. 7 is a flow diagram of steps carried out by a destination host to perform a method 700 of migrating a VM, according to the second embodiment, in which selection of pages to prepopulate mappings for is determined at the source host. Method 700 will be explained with reference to source and destination hosts 100S and 100D of FIG. 3, and the VM migration module 150 of destination host 100D will be referred to as "destination VM migration module" 150. Method 700 is the same as method 500 except step 702 replaces step 504 and step 704 replaces step 508. In addition, step 510 is not necessary in method 700 and so it has been omitted from method 700.

Step 702 is identical to step 504 except destination VM migration module 150 does not update target pages metadata 154. This is because target pages metadata 154 is updated at source host 100S and transmitted to destination host 100D at step 704. For this same reason, step 510 is omitted from method 700. Step 704 is identical to step 508 except destination VM migration module 150 receives target pages metadata 154 from source host 100S.

The embodiments described herein employ various techniques of tracking memory pages that are accessed during migration of VM 110S to intelligently prepopulate nested page tables 142 at destination host 100D. Other techniques may also be utilized in other applications for accomplishing the goal of prepopulating nested page tables 142 to improve the responsiveness of a VM. For example, in the case of reconfiguring an existing VM 110, a new VM 110 may be created on the same host 100. As such, the original VM 110's nested page tables 142, which mostly remain unchanged, may be transferred to the new VM 110. Additionally, in the case of "instant cloning" a VM 110, a clone of an existing VM 110 may be created on the same host 100. As such, nested page tables 142 for the new VM 110 may be prepopulated using mappings from the nested page tables 142 of the original VM 110.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data that can thereafter be input into a computer system. Computer readable media may be based on any existing or subsequently developed technology that embodies computer programs in a manner that enables a computer to read the programs. Examples of computer readable media are HDDs, SSDs, network-attached storage (NAS) systems, read-only memory (ROM), RAM, compact disks (CDs), digital versatile disks (DVDs), magnetic tapes, and other optical and non-optical data storage devices. A computer readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest OS that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of populating page tables of an executing workload during migration of the workload from a source host to a destination host, wherein the page tables are populated at the destination host, the method comprising:
migrating memory pages of the workload from system memory of the source host to system memory of the destination host;
before resuming the workload at the destination host, populating the page tables, wherein the populating of the page tables comprises inserting mappings from a first set of virtual addresses of the workload to a first set of physical addresses of the system memory of the destination host, and the first set of virtual addresses corresponds to a first set of the migrated memory pages; and
upon completion of the populating of the page tables, while the page tables do not contain any mappings from a second set of virtual addresses of the workload to a second set of physical addresses of the system memory of the destination host, resuming the workload at the destination host, wherein the second set of virtual addresses corresponds to a second set of the migrated memory pages.

2. The method of claim 1, wherein the workload is a virtual machine (VM), the page tables are nested page tables of a virtualization software layer, the first and second sets of virtual addresses are guest physical page numbers of the VM, and the first and second sets of physical addresses are machine page numbers of the system memory of the destination host.

3. The method of claim 1, further comprising:
after the resuming of the workload at the destination host, further populating the page tables for the second set of the migrated memory pages as the second set of the migrated memory pages are accessed by the workload, wherein the populating of the page tables for the second set of the migrated memory pages comprises inserting mappings from the second set of virtual addresses to the second set of physical addresses.

4. The method of claim 1, wherein the first set of the migrated memory pages are memory pages that are modified during the migration of the workload.

5. The method of claim 4, wherein each of the first set of physical addresses references a memory page that is larger than each of the first set of the migrated memory pages, and the larger memory pages include the first set of the migrated memory pages and other memory pages that are read from during the migration of the workload.

6. The method of claim 1, further comprising:
setting a predetermined amount of time for the populating of the page tables, wherein the workload is resumed at the destination host in response to the predetermined amount of time elapsing.

7. The method of claim 1, further comprising:
determining to populate the page tables, for the first set of the migrated memory pages before the resuming of the VM at the destination host, based on each of the first set of the migrated memory pages meeting access-recency or access-frequency criteria.

8. A non-transitory computer readable medium comprising instructions that are executable by a destination host, wherein the instructions when executed cause the destination host to carry out a method of populating page tables of an executing workload during migration of the workload from a source host to the destination host, said method comprising:
migrating memory pages of the workload from system memory of the source host to system memory of the destination host;
before resuming the workload at the destination host, populating the page tables, wherein the populating of the page tables comprises inserting mappings from a first set of virtual addresses of the workload to a first set of physical addresses of the system memory of the destination host, and the first set of virtual addresses corresponds to a first set of the migrated memory pages; and upon completion of the populating of the page tables, while the page tables do not contain any mappings from a second set of virtual addresses of the workload to a second set of physical addresses of the system memory of the destination host, resuming the workload at the destination host, wherein the second set of virtual addresses corresponds to a second set of the migrated memory pages.

9. The non-transitory computer readable medium of claim 8, wherein the workload is a virtual machine (VM), the page tables of are nested page tables of a virtualization software layer, the first and second sets of virtual addresses are guest physical page numbers of the VM, and the first and second sets of physical addresses are machine page numbers of the system memory of the destination host.

10. The non-transitory computer readable medium of claim 8, the method further comprising:
after the resuming of the workload at the destination host, further populating the page tables for the second set of the migrated memory pages as the second set of the migrated memory pages are accessed by the workload, wherein the populating of the page tables for the second set of the migrated memory pages comprises inserting mappings from the second set of virtual addresses to the second set of physical addresses.

11. The non-transitory computer readable medium of claim 8, wherein the first set of the migrated memory pages are memory pages that are modified during the migration of the workload.

12. The non-transitory computer readable medium of claim 11, wherein each of the first set of physical addresses references a memory page that is larger than each of the first set of the migrated memory pages, and the larger memory pages include the first set of the migrated memory pages and other memory pages that are read from during the migration of the workload.

13. The non-transitory computer readable medium of claim 8, the method further comprising:
setting a predetermined amount of time for the populating of the page tables, wherein the workload is resumed at the destination host in response to the predetermined amount of time elapsing.

14. The non-transitory computer readable medium of claim 8, the method further comprising:
determining to populate the page tables, for the first set of the migrated memory pages before the resuming of the VM at the destination host, based on each of the first set of the migrated memory pages meeting access-recency or access-frequency criteria.

15. A computer system comprising:
a source host; and
a destination host configured to carry out a method of populating page tables of an executing workload during migration of the workload from the source host to the destination host, the method comprising:
migrating memory pages of the workload from system memory of the source host to system memory of the destination host;
before resuming the workload, populating the page tables, wherein the populating of the page tables comprises inserting mappings from a first set of virtual addresses of the workload to a first set of physical addresses of the system memory of the destination host, and the first set of virtual addresses corresponds to a first set of the migrated memory pages; and
upon completion of the populating of the page tables, while the page tables do not contain any mappings from a second set of virtual addresses of the workload to a second set of physical addresses of the system memory of the destination host, resuming the workload, wherein the second set of virtual addresses corresponds to a second set of the migrated memory pages.

16. The computer system of claim 15, wherein the workload is a virtual machine (VM), the page tables are nested page tables of a virtualization software layer, the first and second sets of virtual addresses are guest physical page numbers of the VM, and the first and second sets of physical addresses are machine page numbers of the system memory of the destination host.

17. The computer system of claim 15, the method further comprising:
after the resuming of the workload, further populating the page tables for the second set of the migrated memory pages as the second set of the migrated memory pages are accessed by the workload, wherein the populating of the page tables for the second set of the migrated memory pages comprises inserting mappings from the second set of virtual addresses to the second set of physical addresses.

18. The computer system of claim 15, wherein the first set of the migrated memory pages are memory pages that are modified during the migration of the workload.

19. The computer system of claim 15, the method further comprising:
setting a predetermined amount of time for the populating of the page tables, wherein the workload is resumed in response to the predetermined amount of time elapsing.

20. The computer system of claim 15, the method further comprising:
determining to populate the page tables, for the first set of the migrated memory pages before the resuming of the VM, based on each of the first set of the migrated memory pages meeting access-recency or access-frequency criteria.

* * * * *